(12) United States Patent
Li (10) Patent No.: US 11,444,527 B2
(45) Date of Patent: Sep. 13, 2022

(54) SWITCHING REGULATOR WITH IMPROVED LOAD REGULATION AND THE METHOD THEREOF

(71) Applicant: Chengdu Monolithic Power Systems Co., Ltd., Chengdu (CN)

(72) Inventor: Lei Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 172 days.

(21) Appl. No.: 17/007,447

(22) Filed: Aug. 31, 2020

(65) Prior Publication Data

US 2021/0067028 A1 Mar. 4, 2021

(30) Foreign Application Priority Data

Sep. 3, 2019 (CN) .......................... 201910827687.9

(51) Int. Cl.
*H02M 3/158* (2006.01)
*H02M 1/08* (2006.01)
*H02M 1/00* (2006.01)
*H02M 1/42* (2007.01)

(52) U.S. Cl.
CPC ........... *H02M 1/083* (2013.01); *H02M 3/158* (2013.01); *H02M 1/0025* (2021.05); *H02M 1/4225* (2013.01)

(58) Field of Classification Search
CPC .......................................... H02M 3/155–1588
See application file for complete search history.

(56) References Cited

U.S. PATENT DOCUMENTS

| | | | |
|---|---|---|---|
| 5,943,227 A * | 8/1999 | Bryson | H02M 3/156 323/283 |
| 8,487,661 B2 | 7/2013 | Wang et al. | |
| 8,803,719 B2 | 8/2014 | Li et al. | |
| 9,041,373 B2 | 5/2015 | Jiang et al. | |
| 9,362,823 B2 | 6/2016 | Li | |
| 9,425,689 B2 | 8/2016 | Li et al. | |
| 9,525,342 B2 | 12/2016 | Li | |
| 9,606,566 B2 | 3/2017 | Li | |
| 9,891,648 B2 | 2/2018 | Li | |
| 10,164,514 B2 | 12/2018 | Li | |
| 10,727,742 B2 | 7/2020 | Chen et al. | |
| 10,797,597 B1 * | 10/2020 | Chang | H02M 3/158 |
| 2011/0057637 A1 * | 3/2011 | Liu | H02M 3/156 323/287 |
| 2017/0317587 A1 * | 11/2017 | Zhang | H02M 3/156 |

OTHER PUBLICATIONS

U.S. Appl. No. 15/488,389, filed Apr. 14, 2017, Chengdu Monolithic Power Systems.

* cited by examiner

*Primary Examiner* — Peter M Novak
(74) *Attorney, Agent, or Firm* — Perkins Coie LLP (57) ABSTRACT

A switching regulator with improved load regulation is discussed. The switching regulator increases an on time length of a first power switch if the switching regulator operates at discontinuous current mode and a current flowing through the second power switch crosses a zero reference, until the first power switch is turned on again; and the switching regulator maintains the on time length of the first power switch during other time period.

16 Claims, 4 Drawing Sheets

SWITCHING REGULATOR WITH IMPROVED LOAD REGULATION AND THE METHOD THEREOF

CROSS-REFERENCE TO RELATED APPLICATIONS

This application claims priority to and the benefit of Chinese Patent Application No. 201910827687.9, filed Sep. 3, 2019, which is incorporated herein by reference in its entirety.

FIELD

The present invention relates to electronic circuits, more specifically, the present invention relates to switching regulators and the control thereof.

BACKGROUND

Constant on time (COT) control is widely used in the power conversion fields due to good transient response and simple circuit configuration.

Existing COT control adopts an error amplifier to continuously integrate a feedback signal indicative of the output voltage under light load condition. However, the output voltage goes high when the load is light, leading to a negative clamp of the output of the error amplifier (i.e., the output of the error amplifier is clamped at a negative reference potential), which slows the load transient response.

Thus, a switching regulator with improved load regulation control is desired.

SUMMARY

It is an object of the present invention to provide a switching regulator with improved load regulation control, which solves the above problems.

In accomplishing the above and other objects, there has been provided, in accordance with an embodiment of the present invention, a switching regulator, comprising: a power stage, having a first power switch and a second power switch configured to be periodically turned on and turned off, to convert an input voltage into an output voltage. The switching regulator further comprises an amplifier and a sample-held circuit. The amplifier is configured to generate an intermediate signal in response to a reference voltage and a feedback voltage indicative of the output voltage. The sample-held circuit is configured to sample and hold the intermediate signal, to generate a sample-held signal. The sample-held circuit is configured to sample the intermediate signal and to hold a sampled result during an operation of the switching regulator, except when both a) the switching regulator operates at discontinuous current mode, and b) a current flowing through the second power switch crosses a zero reference. If both a) the switching regulator operates at discontinuous current mode, and b) the current flowing through the second power switch crosses the zero reference, the sample-held circuit is configured to stop a sampling and to hold a value of the intermediate signal right before the sampling is stopped, until the first power switch is turned on again.

In addition, there has been provided, in accordance with an embodiment of the present invention, a switching regulator, comprising: a power stage, having a first power switch and a second power switch configured to be periodically turned on and turned off, to convert an input voltage into an output voltage. The switching regulator further comprises a controller, configured to control the first power switch and the second power switch. An on time length of the first power switch is controlled to be maintained during an operation of the switching regulator, except when both a) the switching regulator operates at discontinuous current mode, and b) a current flowing through the second power switch crosses a zero reference. If both a) the switching regulator operates at discontinuous current mode, and b) the current flowing through the second power switch crosses the zero reference, the on time length of the first power switch is controlled to be increased, until the first power switch is turned on again.

Furthermore, there has been provided, in accordance with an embodiment of the present invention, a method used in a switching regulator. The switching regulator includes a first power switch and a second power switch, configured to be periodically turned on and off, to convert an input voltage into an output voltage. The method comprising: generating an intermediate signal in response to a reference voltage and a feedback voltage indicative of the output voltage; and keeping sampling the intermediate signal and holding a sampled result to generate the sample-held signal during an operation of the switching regulator, except when both a) the switching regulator operates at discontinuous current mode, and b) a current flowing through the second power switch crosses a zero reference; and wherein if both a) the switching regulator operates at discontinuous current mode, and b) the current flowing through the second power switch crosses the zero reference, stopping a sampling and holding the intermediate signal right before the sampling is stopped, until the first power switch is turned on again.

BRIEF DESCRIPTION OF THE DRAWINGS

The use of the similar reference label in different drawings indicates the same of like components.

DETAILED DESCRIPTION

Embodiments of circuits for switching regulator are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
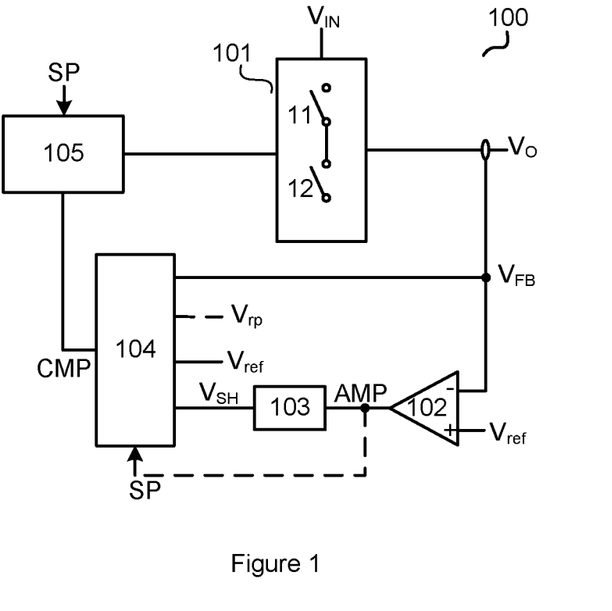
FIG. 1 schematically shows a switching regulator 100 in accordance with an embodiment of the present invention.

FIG. 1 schematically shows a switching regulator 100 in accordance with an embodiment of the present invention. In the example of FIG. 1, the switching regulator 100 comprises: a power stage 101, having a first power switch 11 and a second power switch 12 configured to be periodically turned on and turned off, to convert an input voltage $V_{IN}$ into an output voltage $V_O$; an amplifier 102, configured to generate an intermediate signal AMP in response to a reference voltage $V_{ref}$ and a feedback voltage $V_{FB}$ indicative of the output voltage $V_O$; and a sample-held circuit 103, configured to sample and hold the intermediate signal AMP, to generate a sample-held signal $V_{SH}$: wherein if the switching regulator 100 operates at DCM (discontinuous current mode) and a current flowing through the second power switch 12 crosses a zero reference, the sample-held circuit 103 is configured to stop a sampling and to hold a value of the intermediate signal AMP right before the sampling is stopped, until the first power switch 11 is turned on again; and the sample-held circuit 103 is configured to continuously sample the intermediate signal AMP and to continuously hold a sampled result during other time period.

In the example of FIG. 1, the switching regulator 100 further comprises: a comparing circuit 104, configured to generate a comparison signal CMP in response to the feedback voltage $V_{FB}$, the sample-held signal $V_{SH}$ and the reference voltage $V_{ref}$; and a logical control circuit 105, configured to generate a control signal in response to the comparison signal CMP, to control the first power switch 11 and the second power switch 12, wherein an on time length of the first power switch 11 is controlled to be increased if the switching regulator operates at DCM and the current flowing through the second power switch 12 crosses the zero reference, until the first power switch 11 is turned on again, and the on time length of the first power switch 11 is controlled to be maintained during other time period.

In one embodiment, the comparing circuit 104 and the logical control circuit 105 are disabled or enabled in response to a sleep signal, to enter or exit sleep mode.

In one embodiment, if the switching regulator 100 operates at DCM and the current flowing through the second power switch 12 crosses the zero reference, because the sampling is paused, the amplifier 102 operates as a comparator. If the feedback voltage $V_{FB}$ is higher than the reference voltage $V_{ref}$, the sleep signal is high. Then the comparing circuit 104 and the logical control circuit 105 are disabled, causing the first power switch 11 and the second power switch 12 to be at high-impedance (hi-z) status, and the system to enter sleep mode. If the feedback voltage $V_{FB}$ is lower than the reference voltage $V_{ref}$, the sleep signal is low. Then the comparing circuit 104 and the logical control circuit 105 resume to be enabled. Accordingly, the first power switch 11 and the second power switch resume work, and the system exits sleep mode.

In one embodiment, the comparing circuit 104 is configured to further receive a slope compensation signal $V_{rp}$, and to generate the comparison signal CMP in response to the feedback voltage $V_{FB}$, the sample-held signal $V_{SH}$, the reference voltage $V_{ref}$ and the slope compensation signal $V_{rp}$. In one embodiment, the comparing circuit 104 is configured to generate the comparison signal CMP by comparing (1) a sum of the sample-held signal $V_{SH}$ and the reference voltage $V_{ref}$ with (2) a sum of the slope compensation signal $V_{rp}$ and the feedback voltage $V_{FB}$.

Figure 2:
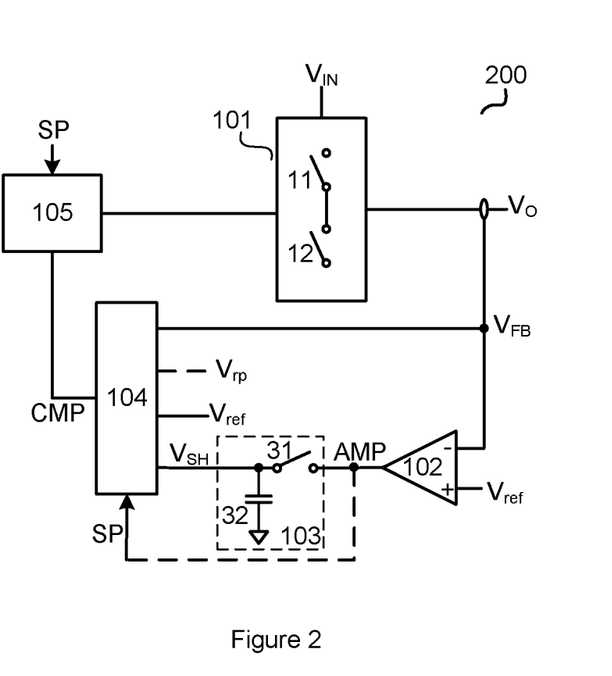
FIG. 2 schematically shows a switching regulator 200 in accordance with an embodiment of the present invention.

FIG. 2 schematically shows a switching regulator 200 in accordance with an embodiment of the present invention. In the example of FIG. 2, the sample-held circuit 103 comprises: a sample switch 31, coupled between the amplifier 102 and the comparing circuit 104, wherein the sample switch 31 is configured to be turned off if the switching regulator 200 operates at DCM and the current flowing through the second power switch 12 crosses the zero reference, until the first power switch 11 is turned on again, and wherein the sample switch 31 is configured to be maintained on during other time period; a capacitor 32, coupled to the amplifier 102 by way of the sample switch 31, wherein the capacitor 32 is configured to be a compensation capacitor of the amplifier 102 when the sample switch 31 is turned on, and a voltage drop of the capacitor 32 is the sample-held signal $V_{SH}$.

Figure 3:
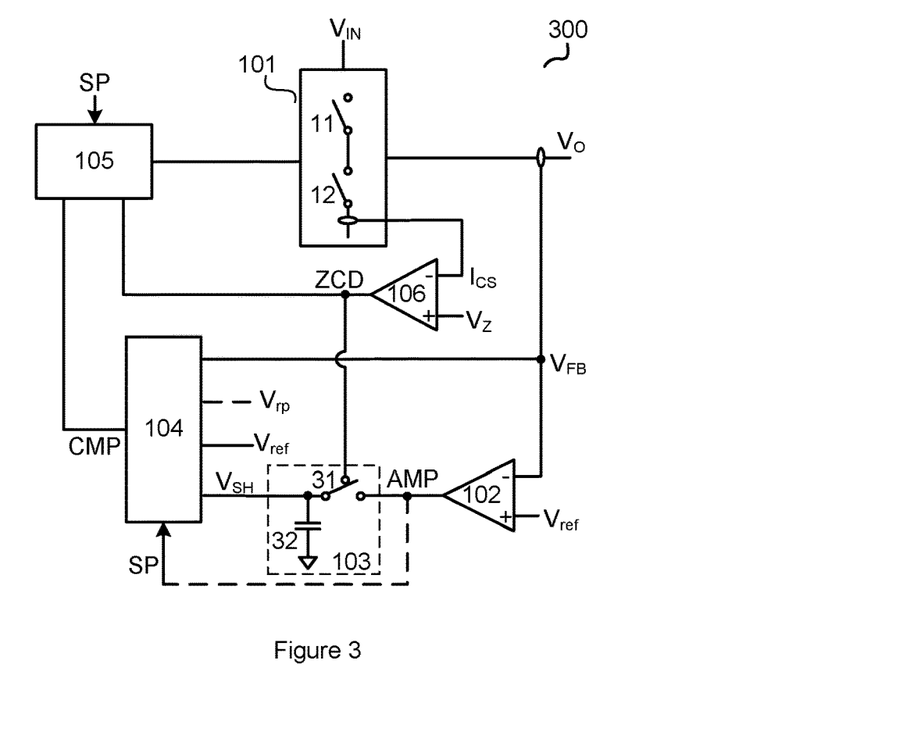
FIG. 3 schematically shows a switching regulator 300 in accordance with an embodiment of the present invention.

FIG. 3 schematically shows a switching regulator 300 in accordance with an embodiment of the present invention. The switching regulator 300 in FIG. 3 is similar to the switching regulator 200 in FIG. 2, with a difference that in the example of FIG. 3, the switching regulator 300 further comprises: a zero comparator 106, configured to compare a zero voltage reference $V_Z$ with a current sense signal $I_{CS}$ indicative of the current flowing through the second power switch 12, to generate a zero detection signal ZCD, wherein when the current sense signal $I_{CS}$ is lower than the zero voltage reference $V_Z$, the sample-held circuit 103 is configured to stop sampling the intermediate signal AMP, until the first power switch 11 is turned on again (i.e., the sampling is paused due to the sample switch 31 is turned off, resulting disconnection between the capacitor 32 and the amplifier 102), and the on time length of the first power switch is controlled to be increased.

In one embodiment, the zero detection signal ZCD is high when the current sense signal $I_{CS}$ is lower than the zero voltage reference $V_Z$.

In one embodiment, the zero voltage reference $V_Z$ has a voltage value of 0.1V.

Figure 4:
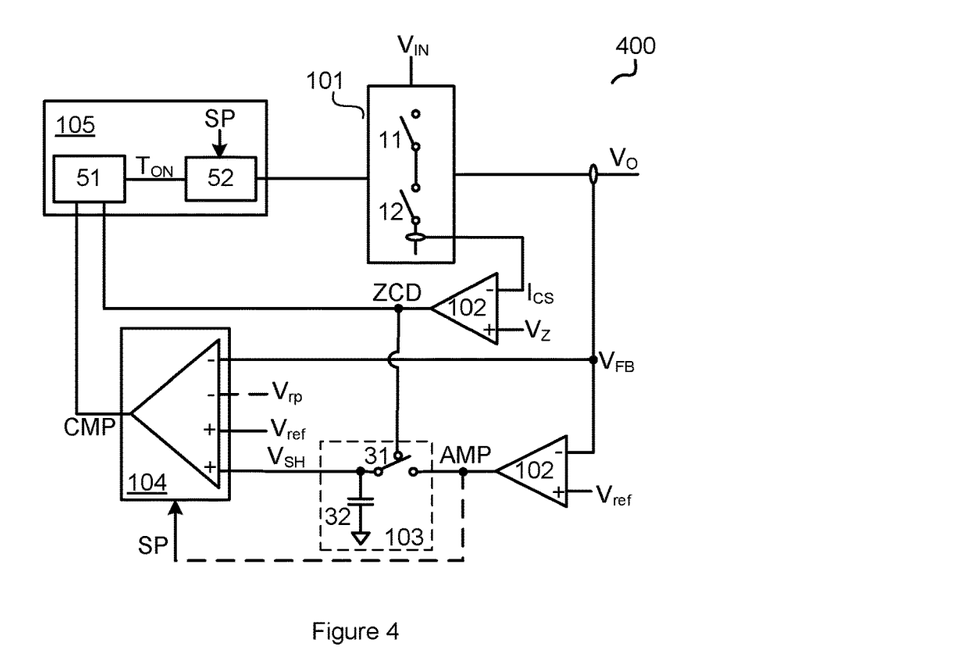
FIG. 4 schematically shows a switching regulator 400 with circuit configurations of the comparing circuit 104 and the logical control circuit 105 in accordance with an embodiment of the present invention.

FIG. 4 schematically shows a switching regulator 400 with circuit configurations of the comparing circuit 104 and the logical control circuit 105 in accordance with an embodiment of the present invention. In the example of FIG. 4, the comparing circuit 104 comprises a comparator, having two non-inverting input terminals and two inverting input terminals, wherein the two non-inverting input terminals is respectively configured to receive the sample-held signal $V_{SH}$ and the reference voltage $V_{ref}$, and the two inverting input terminals is respectively configured to receive the slope compensation signal $V_{rp}$ and the feedback voltage $V_{FB}$. That is, the comparator is configured to compare (1) the sum of the sample-held signal $V_{SH}$ and the reference voltage $V_{ref}$ with (2) the sum of the slope compensation signal $V_{rp}$ and the feedback voltage $V_{FB}$, to generate the comparison signal CMP.

In the example of FIG. 4, the logical control circuit 105 comprises: an on timer 51, configured to generate a turn-on signal Ton in response to the comparison signal CMP and the zero detection signal ZCD, wherein the turn-on signal Ton has a longer high level if the switching regulator operates at DCM and the current sense signal $I_{CS}$ falls to (and/or is lower than) the zero voltage reference $V_Z$, so as to increase the on time length of first power switch 11, and wherein the turn-on signal Ton is operable to control the first power switch to have a maintained on time length during other time period; and a logical unit 52, configured to generate the control signal in response to the turn-on signal Ton. In one embodiment, the logical unit 52 is configured to be disabled or enabled under the control of the sleep signal SP, to enter or exit sleep mode.

Figure 5:
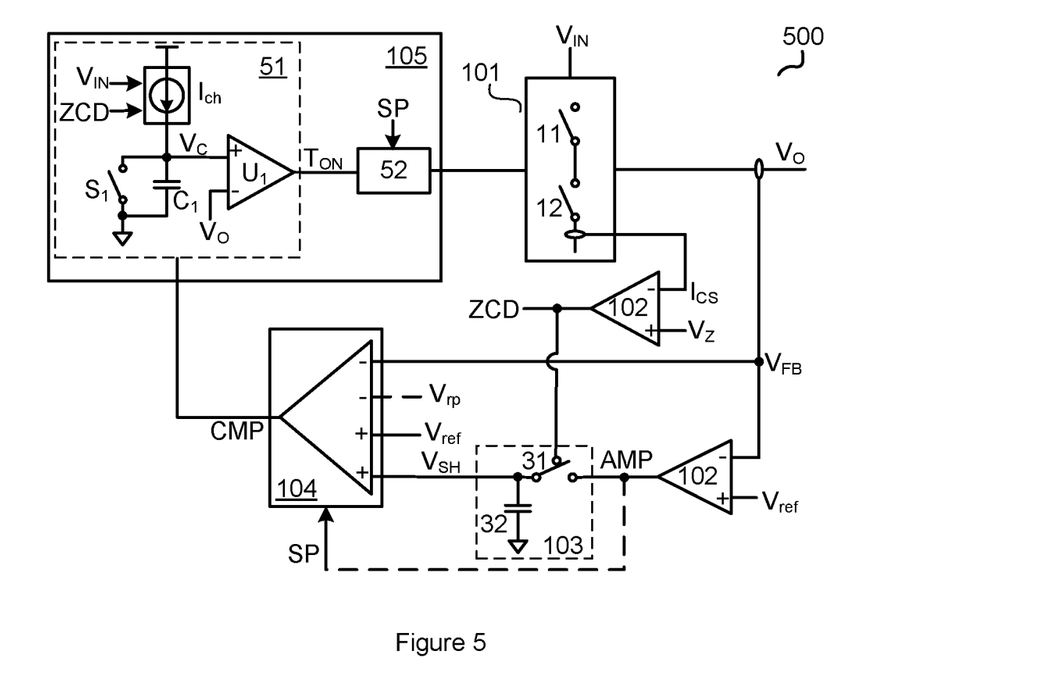
FIG. 5 schematically shows a switching regulator 500 with a circuit configuration of the on timer 51 in accordance with an embodiment of the present invention.

FIG. 5 schematically shows a switching regulator 500 with a circuit configuration of the on timer 51 in accordance with an embodiment of the present invention. In the example of FIG. 5, the on timer 51 comprises: a controlled current source Ion, configured to provide a charge current related to the input voltage (e.g. the charge current is proportional to the input voltage $V_{IN}$); a charge capacitor $C_1$; a reset switch $S_1$, wherein the charge capacitor $C_1$ is charged by the controlled current source Ion when the reset switch $S_1$ is turned off, and a voltage across $V_C$ of the charge capacitor $C_1$ is reset when the reset switch $S_1$ is turned on; and a charge comparator $U_1$, configured to compare the voltage across $V_C$ of the charge capacitor $C_1$ with a signal indicative of the output voltage $V_O$, to generate the turn-on signal Ton, wherein an effective (and/or equivalent) charge current is reduced when the zero detection signal ZCD indicates that the current sense signal $I_{CS}$ falls to the zero voltage reference $V_Z$ (e.g. when the zero detection signal ZCD is high).

In one embodiment, the effective charge current supplied to the charge capacitor $C_1$ may be reduced by shortening the charge time, while maintaining the charge current of the controlled current source 6 unchanged. In another embodiment, the effective charge current supplied to the charge capacitor $C_1$ may be reduced by lowering the charge current of the controlled current source 6, while maintaining the charge time unchanged. In other embodiments, the effective charge current supplied to the charge capacitor $C_1$ may be reduced by both shortening the charge time and lowering the charge current of the controlled current source 6.

Figure 6:
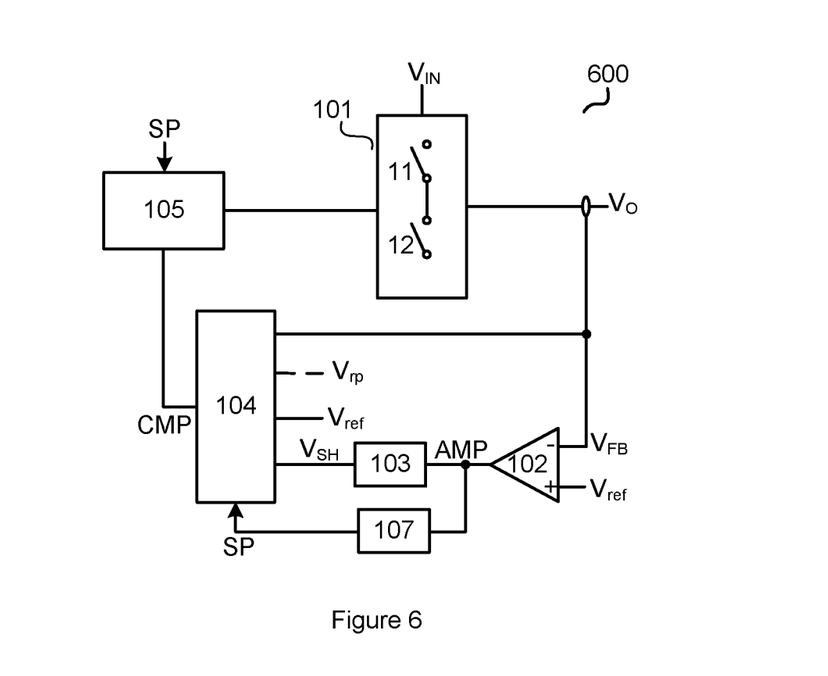
FIG. 6 schematically shows a switching regulator 600 in accordance with an embodiment of the present invention.

FIG. 6 schematically shows a switching regulator 600 in accordance with an embodiment of the present invention. The switching regulator 600 in FIG. 6 is similar to the switching regulator 100 in FIG. 1, with a difference that in the example of FIG. 6, the switching regulator 600 further comprises: a Schmitt output stage 107, coupled to the amplifier 102 to receive the intermediate signal AMP to generate the sleep signal SP. If the switching regulator operates at DCM and the current flowing through the second power switch 12 crosses the zero reference, the amplifier 102 operates as a comparator. Because of the slow conversion speed of the amplifier 102, the Schmitt output stage 107 is coupled to the amplifier 102, to provide prompt sleep signal SP.

During the operation of the switching regulator, when the load is relatively heavy, the system operates under CCM (continuous current mode). The sample switch 31 is maintained on, and the sample-held circuit 103 keeps sampling the intermediate signal AMP and holding the sampled result. The intermediate signal AMP is the sample-held signal $V_{SH}$, and the amplifier 102 operates as an error amplifier. That is, the sample-held circuit 103 is configured to deliver the intermediate signal AMP to the comparator 104, and the intermediate signal AMP is an error amplified signal. The comparing circuit 104 is configured to generate a comparison signal CMP in response to variations of the intermediate signal AMP, the reference voltage $V_{ref}$, the slope compensation signal $V_{rp}$ and the feedback voltage $V_{FB}$. When the sum of the intermediate signal AMP and the reference voltage $V_{ref}$ is higher than the sum of the slope compensation signal $V_{rp}$ and the feedback voltage $V_{FB}$, the on timer 51 is configured to start timing, to provide the turn-on signal Ton with maintained (and/or constant) on time length, to control the power stage 101.

When the load goes lighter, causing the system to enter discontinuous current mode, the current flowing through the second power switch 12 is detected (e.g., the current is detected by a sense resistor coupled in series with the second power switch 12, or by a switch formed in a mirror way with the second power switch 12, or by detecting a voltage across the second power switch 12, etc., not shown). When the current reduces to zero (e.g., when the current sense signal $I_{CS}$ is lower than the zero voltage reference $V_Z$), the sample switch 31 is turned off, and the sampling of the intermediate signal AMP is stopped. Consequently, the voltage across the capacitor 32 (i.e. the sample-held signal $V_{SH}$) is the intermediate signal AMP right before the sampling is stopped. Due to the turning off of the sample switch 31, the capacitor 32 is disconnected from the amplifier 102. Then the amplifier 102 operates as a comparator. That is, the amplifier 102 is configured to compare the feedback voltage $V_{FB}$ with the reference voltage $V_{ref}$ to output a signal with positive and negative levels. The intermediate signal AMP is the comparison signal. If the feedback voltage $V_{FB}$ reaches (and/or is higher than) the reference voltage $V_{ref}$, the intermediate signal AMP output by the amplifier 102 is low. The Schmitt output stage 107 generates the sleep signal SP in response to the low intermediate signal, to have the system enter sleep mode. Accordingly, the comparing circuit 104 and the logical control circuit 105 are disabled, and the first power switch 11 and the second power switch 12 turn to high-impedance (hi-z) state. Then the output voltage $V_O$ falls. When the output voltage $V_O$ falls to a certain voltage value, causing the feedback voltage $V_{FB}$ to be lower than the reference voltage $V_{ref}$, the intermediate signal AMP output by the amplifier 102 turns to high. Consequently, the Schmitt output stage 107 changes the state of the sleep signal SP, to let the system exit sleep mode. The comparing circuit 104 and the logical control circuit 105 resume to be enabled. Then the voltage across the capacitor 32 (i.e. the sample-held signal $V_{SH}$) is equal to the voltage value of the intermediate signal AMP right before the sampling is stopped. As a result, the system control loop (e.g., the comparing circuit 104, the on timer 51, and etc.) is configured to generate the control signal in response to this sample-held signal $V_{SH}$ when the system resumes to normal operation.

Several embodiments of the foregoing switching regulator provide improved load regulation compared to conventional technique discussed above. Unlike the conventional technique, several embodiments of the foregoing switching regulator adopt an amplifier operating as a comparator if the switching regulator operates at DCM and the current flowing through the second power switch 12 crosses the zero reference; and the output of the amplifier is used to judge whether the system needs to enter or exit the sleep mode. When the system enters the sleep mode, because the comparing circuit is disabled, the quiescent current is reduced. And when the system exits the sleep mode, because of the existence of the sample-held circuit, the parameters (e.g. the parameter used in the comparing circuit) in the system control loop is the intermediate signal before the current flowing through the second power switch 12 crosses zero. This intermediate signal corresponds to the output voltage $V_O$ when the current flowing through the second power switch 12 does not cross zero. Thus, the output voltage $V_O$ would not get pumped when the system resumes to normal operation, which improves load regulation.

Figure 7:
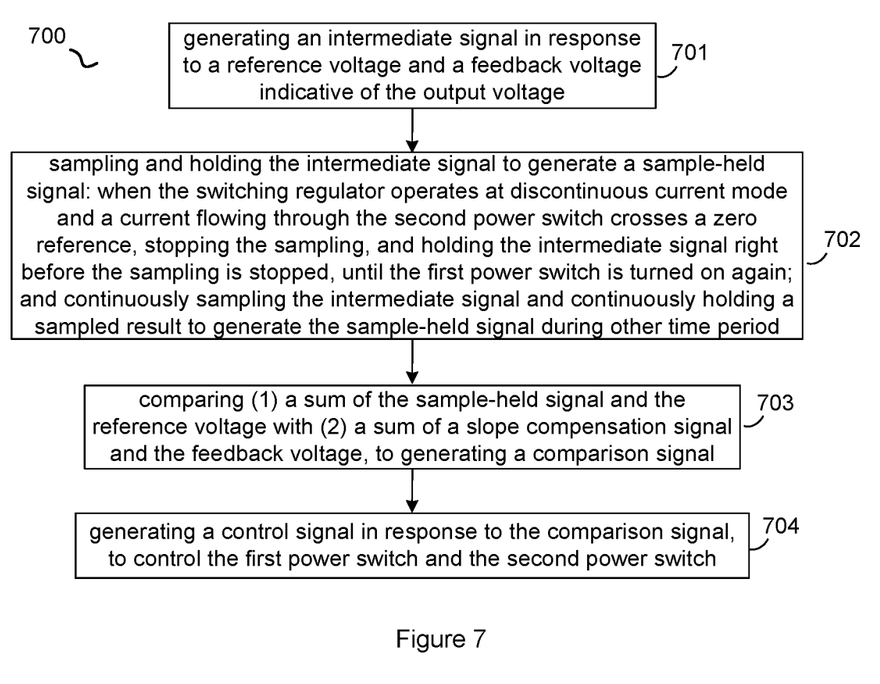
FIG. 7 schematically shows a flowchart 700 of a method used in a switching regulator in accordance with an embodiment of the present invention.

FIG. 7 schematically shows a flowchart 700 of a method used in a switching regulator in accordance with an embodiment of the present invention. The switching regulator includes a first power switch and a second power switch, configured to be periodically turned on and off, to convert an input voltage into an output voltage. The method comprises:

Step 701, generating an intermediate signal in response to a reference voltage and a feedback voltage indicative of the output voltage.

Step 702, sampling and holding the intermediate signal to generate a sample-held signal: if the switching regulator operates at discontinuous current mode and a current flowing through the second power switch crosses a zero reference, stopping the sampling, and holding the intermediate signal right before the sampling is stopped, until the first power switch is turned on again; and continuously sampling the intermediate signal and continuously holding a sampled result to generate the sample-held signal during other time period.

Step 703, comparing (1) a sum of the sample-held signal and the reference voltage with (2) a sum of a slope compensation signal and the feedback voltage, to generating a comparison signal. And Step 704, generating a control signal in response to the comparison signal, to control the first power switch and the second power switch.

In one embodiment, the method further comprises: comparing the feedback voltage with the reference voltage if the switching regulator operates at DCM and the current flowing through the second power switch crosses the zero reference, to generate the intermediate signal; and amplifying a difference of the feedback voltage and the reference voltage during other time period, to generate the intermediate signal.

In one embodiment, if the switching regulator operates at DCM and the current flowing through the second power switch crosses the zero reference, the switching regulator enters sleep mode if the feedback voltage reaches the reference voltage.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A switching regulator, comprising:
   a power stage, having a first power switch and a second power switch configured to be periodically turned on and turned off, to convert an input voltage into an output voltage;
   an amplifier, configured to generate an intermediate signal in response to a reference voltage and a feedback voltage indicative of the output voltage; and
   a sample-held circuit, configured to sample and hold the intermediate signal, to generate a sample-held signal, wherein the sample-held circuit is configured to sample the intermediate signal and to hold a sampled result during an operation of the switching regulator, except when both a) the switching regulator operates at discontinuous current mode, and b) a current flowing through the second power switch crosses a zero reference; and wherein if both a) the switching regulator operates at discontinuous current mode, and b) the current flowing through the second power switch crosses the zero reference, the sample-held circuit is configured to stop a sampling and to hold a value of the intermediate signal right before the sampling is stopped, until the first power switch is turned on again.

2. The switching regulator of claim 1, wherein the sample-held circuit comprises:
   a sample switch, coupled to the amplifier, wherein the sample switch is configured to be maintained on during the operation of the switching regulator, except when both a) the switching regulator operates at discontinuous current mode, and b) the current flowing through the second power switch crosses the zero reference; and wherein if both a) the switching regulator operates at discontinuous current mode, and b) the current flowing through the second power switch crosses the zero reference, the sample switch is configured to be turned off, until the first power switch is turned on again; and
   a capacitor, coupled to the amplifier by way of the sample switch, wherein a voltage drop of the capacitor is the sample-held signal.

3. The switching regulator of claim 1, further comprising:
   a comparing circuit, configured to generate a comparison signal in response to the feedback voltage, the sample-held signal and the reference voltage; and
   a logical control circuit, configured to generate a control signal in response to the comparison signal, to control the first power switch and the second power switch, wherein an on time length of the first power switch is controlled to be maintained during the operation of the switching regulator, except when both a) the switching regulator operates at discontinuous current mode, and b) the current flowing through the second power switch crosses the zero reference; and wherein if both a) the switching regulator operates at discontinuous current mode, and b) the current flowing through the second power switch crosses the zero reference, the on time length of the first power switch is controlled to be increased, until the first power switch is turned on again.

4. The switching regulator of claim 3, further comprising:
   a Schmitt output stage, configured to generate a sleep signal if the feedback voltage is lower than the reference voltage, to disable the comparing circuit and the logical control circuit.

5. The switching regulator of claim 3, further comprising:
   a zero comparator, configured to compare a zero voltage reference with a current sense signal indicative of the current flowing through the second power switch, to generate a zero detection signal.

6. The switching regulator of claim 5, wherein when the current sense signal falls to the zero voltage reference:
   the sample-held circuit is configured to stop sampling the intermediate signal, until the first power switch is turned on; and
   the on time length of the first power switch is controlled to be increased.

7. The switching regulator of claim 5, wherein the logical control circuit comprises:
   an on timer, configured to generate a turn-on signal in response to the comparison signal and the zero detection signal, wherein the turn-on signal is operable to control the first power switch to have a maintained on time length during the operation of the switching regulator, except when both a) the switching regulator operates at discontinuous current mode, and b) the current flowing through the second power switch crosses the zero reference; and wherein if both a) the switching regulator operates at discontinuous current mode, and b) the current flowing through the second power switch crosses the zero reference, the turn-on signal is operable to control the first power switch to have an increased on time length, until the first power switch is turned on again; and a logical unit, configured to generate the control signal in response to the turn-on signal.

8. The switching regulator of claim 7, wherein the on timer comprises:

a controlled current source, configured to provide a charge current related to the input voltage;

a charge capacitor;

a reset switch, wherein the charge capacitor is charged by the controlled current source when the reset switch is turned off, and a voltage across of the charge capacitor is reset when the reset switch is turned on; and a charge comparator, configured to compare the voltage across of the charge capacitor with a signal indicative of the output voltage, to generate the turn-on signal, wherein an effective charge current is reduced when the zero detection signal indicates that the current sense signal falls to the zero voltage reference.

9. A switching regulator, comprising:

a power stage, having a first power switch and a second power switch configured to be periodically turned on and turned off, to convert an input voltage into an output voltage; and a controller, configured to control the first power switch and the second power switch, wherein an on time length of the first power switch is controlled to be maintained during an operation of the switching regulator, except when both a) the switching regulator operates at discontinuous current mode, and b) a current flowing through the second power switch crosses a zero reference; and wherein if both a) the switching regulator operates at discontinuous current mode, and b) the current flowing through the second power switch crosses the zero reference, the on time length of the first power switch is controlled to be increased, until the first power switch is turned on again.

10. The switching regulator of claim 9, wherein the controller comprises:

a sample-held circuit, configured to sample and hold an intermediate signal indicative of the output voltage, to generate a sample-held signal, wherein the sample-held circuit is configured to sample the intermediate signal and to hold a sampled result during the operation of the switching regulator, except when both a) the switching regulator operates at discontinuous current mode, and b) the current flowing through the second power switch crosses the zero reference; and wherein if both a) the switching regulator operates at discontinuous current mode, and b) the current flowing through the second power switch crosses the zero reference, the sample-held circuit is configured to stop a sampling and to hold a value of the intermediate signal right before the sampling is stopped, until the first power switch is turned on again;

a comparing circuit, configured to generate a comparison signal in response to a feedback voltage indicative of the output voltage, the sample-held signal and a reference voltage; and a logical control circuit, configured to generate a control signal in response to the comparison signal, to control the first power switch and the second power switch.

11. The switching regulator of claim 10, wherein the logical control circuit comprises:

an on timer, configured to generate a turn-on signal in response to the comparison signal and the zero detection signal, wherein the turn-on signal is operable to control the on time length of the first power switch to be maintained during the operation of the switching regulator, except when both a) the switching regulator operates at discontinuous current mode, and b) the current flowing through the second power switch crosses the zero reference; and wherein if both a) the switching regulator operates at discontinuous current mode, and b) the current flowing through the second power switch crosses the zero reference, the turn-on signal is operable to control the on time length of the first power switch to be increased; and a logical unit, configured to generate the control signal in response to the turn-on signal.

12. The switching regulator of claim 10, further comprising:

a Schmitt output stage, configured to generate a sleep signal if the feedback voltage is lower than the reference voltage, to disable the comparing circuit and the logical control circuit.

13. A method used in a switching regulator, the switching regulator includes a first power switch and a second power switch, configured to be periodically turned on and off, to convert an input voltage into an output voltage, the method comprising:

generating an intermediate signal in response to a reference voltage and a feedback voltage indicative of the output voltage; and keeping sampling the intermediate signal and holding a sampled result to generate the sample-held signal during an operation of the switching regulator, except when both a) the switching regulator operates at discontinuous current mode, and b) a current flowing through the second power switch crosses a zero reference; and wherein if both a) the switching regulator operates at discontinuous current mode, and b) the current flowing through the second power switch crosses the zero reference, stopping a sampling and holding the intermediate signal right before the sampling is stopped, until the first power switch is turned on again.

14. The method of claim 13, further comprising:

comparing (1) a sum of the sample-held signal and the reference voltage with (2) a sum of a slope compensation signal and the feedback voltage, to generating a comparison signal; and generating a control signal in response to the comparison signal, to control the first power switch and the second power switch.

15. The method of claim 13, wherein:

the intermediate signal is generated by 1) comparing the feedback voltage with the reference voltage if the switching regulator operates at discontinuous current mode and the current flowing through the second power switch crosses the zero reference, and 2) amplifying a difference of the feedback voltage and the reference voltage during other time period.

16. The method of claim 13, wherein:

if the switching regulator operates at discontinuous current mode and the current flowing through the second power switch crosses the zero reference, the switching regulator enters sleep mode if the feedback voltage reaches the reference voltage.

\* \* \* \* \*